United States Patent [19]
Mitchell, Jr. et al.

[11] Patent Number: 5,232,346
[45] Date of Patent: Aug. 3, 1993

[54] ROTOR ASSEMBLY AND PLATFORM SPACER THEREFOR

[75] Inventors: Robert K. Mitchell, Jr., Hamilton; Mark J. Bailey, Cincinnati, both of Ohio

[73] Assignee: General Electric Company, Cincinnati, Ohio

[21] Appl. No.: 928,265

[22] Filed: Aug. 11, 1992

[51] Int. Cl.$^5$ .............................................. B64C 11/04
[52] U.S. Cl. ..................... 416/215; 416/216; 416/218; 416/193 A
[58] Field of Search .................. 416/193 A, 215, 216, 416/218

[56] References Cited

U.S. PATENT DOCUMENTS

| | | | |
|---|---|---|---|
| 3,120,277 | 2/1964 | Brown et al. | 416/215 |
| 3,203,666 | 8/1965 | West | 416/215 |
| 3,309,058 | 3/1967 | Blackhurst et al. | 253/77 |
| 3,712,757 | 1/1973 | Goodwin | 416/245 |
| 3,742,706 | 7/1973 | Klompas | 416/216 |
| 3,902,824 | 9/1975 | Sauer | 416/215 |
| 4,080,101 | 3/1978 | Zlotek | 416/216 |
| 5,049,035 | 9/1991 | Marlin | 416/193 A |
| 5,131,814 | 7/1992 | Przytolski et al. | 416/193 A |

FOREIGN PATENT DOCUMENTS 2006883  5/1979  United Kingdom .
2049068  12/1980  United Kingdom .

OTHER PUBLICATIONS

I. E. Treager, "Aircraft Gas Turbine Engine Technology," 1979, pp.: i, ii, 469–477.

Primary Examiner—Edward K. Look
Assistant Examiner—Mark Sgantzos
Attorney, Agent, or Firm—Jerome C. Squillaro

[57] ABSTRACT

A platform spacer is joinable to a rotor disk between adjacent rotor blades having dovetails retained in a circumferential dovetail groove therein. The spacer includes a platform having a flat upper surface sized for abutting adjacent blade platforms to form an inner flowpath, and first and second hooks extending downwardly from the platform lower surface. The first and second hooks are configured for insertion radially inwardly through first and second loading recesses in the rotor disk for retention thereto.

10 Claims, 6 Drawing Sheets

ROTOR ASSEMBLY AND PLATFORM SPACER THEREFOR

The present invention relates generally to gas turbine engines, and, more specifically, to a rotor assembly having a lightweight platform spacer for reducing centrifugally generated loads.

BACKGROUND OF THE INVENTION

A gas turbine engine such as that used for powering an aircraft includes rotor blades such as those found in a compressor thereof which are suitably fixedly joined to a rotor disk for accommodating centrifugal and aerodynamic loads generated during operation. As the rotor disk rotates during operation, the blades joined thereto are centrifuged radially outwardly, with the centrifugal loads generated thereby being suitably channeled to the rotor disk at stresses below predetermined stress limits for ensuring an effective useful life of the bladed disk combination.

More specifically, the blade includes an airfoil having an integral dovetail which is retained in a complementary dovetail groove in the perimeter of the rotor disk for retaining the blade thereto during operation. The blade dovetail may either be an axial-entry type which is disposed in a complementary axially extending dovetail groove in the rotor disk, or may be a circumferential-entry type disposed in a complementary circumferentially extending groove in the perimeter of the rotor disk. Formed integrally at the juncture of the airfoil and dovetail is a platform having a width extending in the circumferential direction which is suitably large to abut adjacent platforms to provide a radially inner flowpath boundary for the airflow channeled between the airfoils.

As the diameter of the rotor disk increases for larger engine designs relative to the number of blades used in a blade row for increasing mass flowrate and improving specific fuel consumption (SFC), the resulting width of each blade platform increases. As the platform width is made larger, the centrifugal loads therefrom will increase which typically requires a larger dovetail and rotor disk for accommodating all of the centrifugally induced loads of the airfoil, platform, and dovetail itself while maintaining acceptable levels of stress therein. The increased weight due to the larger dovetail and rotor disk offsets the improvements in SFC.

SUMMARY OF THE INVENTION

A platform spacer is joinable to a rotor disk between adjacent rotor blades having dovetails retained in a circumferential dovetail groove therein. The spacer includes a platform having a flat upper surface sized for abutting adjacent blade platforms to form an inner flowpath, and first and second hooks extending downwardly from the platform lower surface. The first and second hooks are configured for insertion radially inwardly through first and second loading recesses in the rotor disk for retention thereto.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
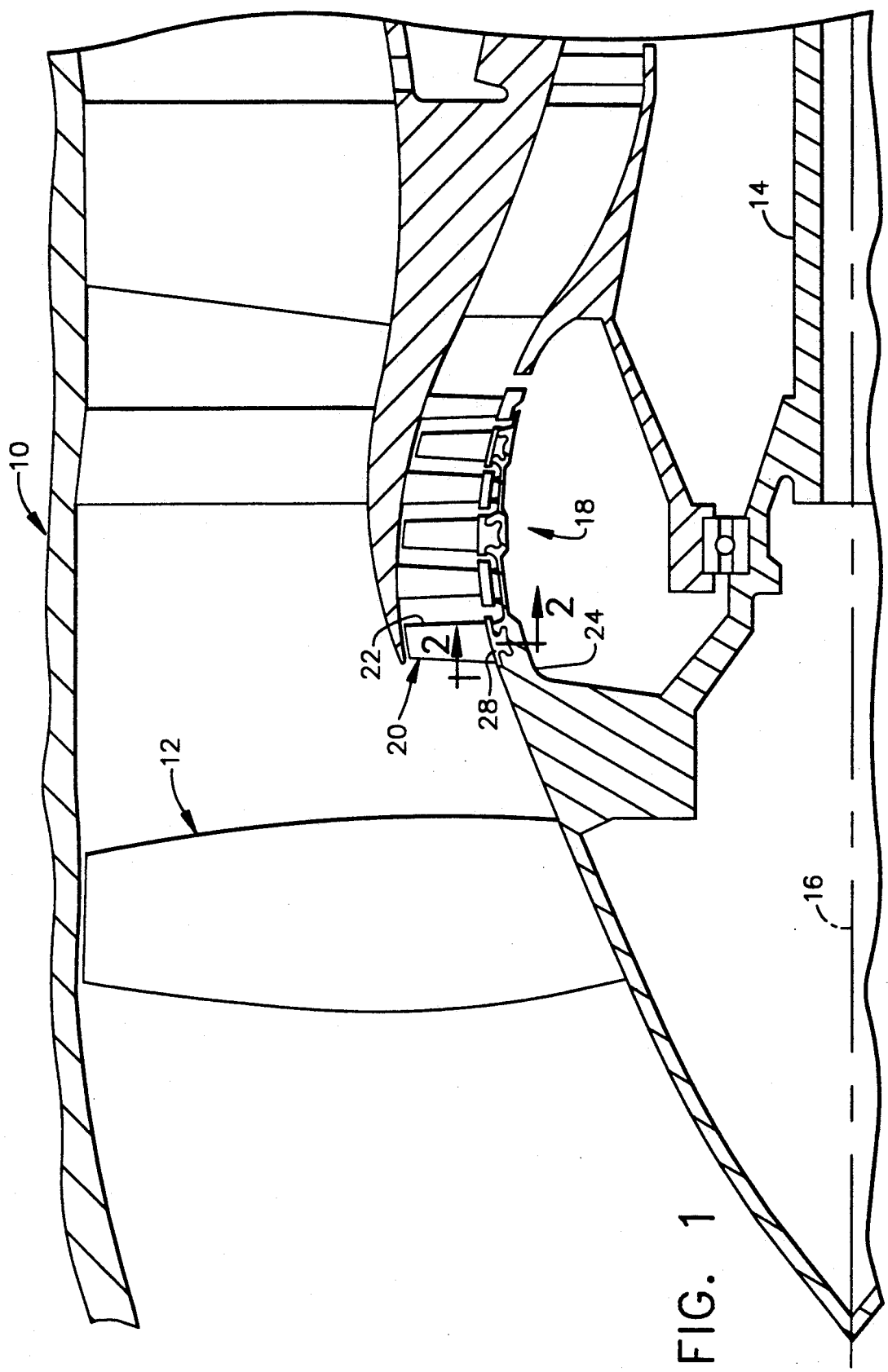
FIG. 1 is an axial, partly sectional view of a fan and compressor portion of an exemplary aircraft gas turbine engine having an improved rotor assembly in accordance with the present invention.

Illustrated schematically in FIG. 1 is a portion of an exemplary turbofan aircraft gas turbine engine 10 including a conventional fan 12 mounted to a fan shaft 14 for rotation about a longitudinal or axial centerline axis 16 thereof. The engine 10 further includes a multi-stage low pressure compressor 18, also known as a booster compressor, which is also joined to the fan shaft 14 for rotation therewith.

Figure 2:
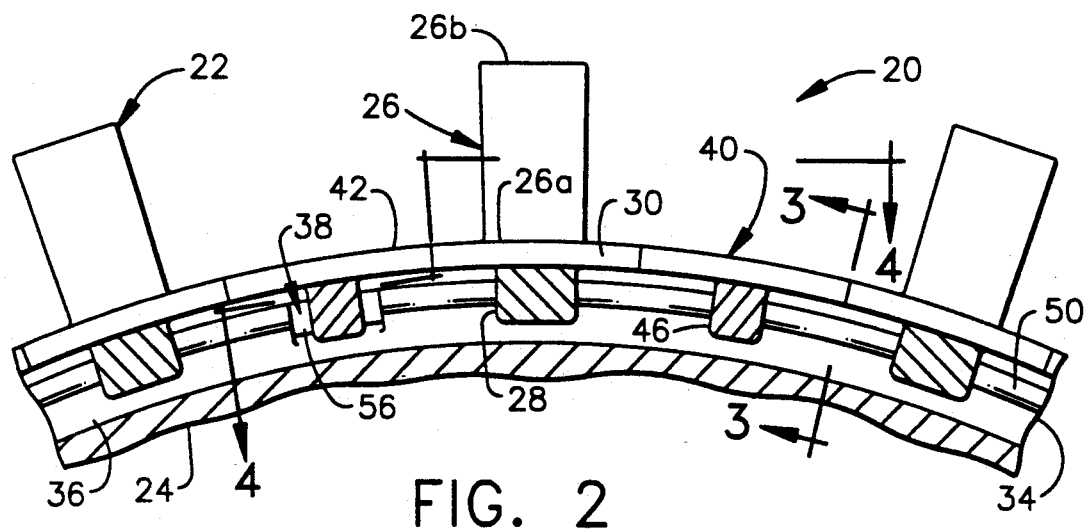
FIG. 2 is a transverse, partly sectional view of a portion of the first stage compressor blade row illustrated in FIG. 1 taken along line 2—2.

Referring to both FIGS. 1 and 2, the compressor 18 includes three exemplary blade row stages each of which includes a rotor assembly 20 having a plurality of circumferentially spaced apart rotor blades 22 joined to an annular rotor disk 24 in accordance with one embodiment of the present invention. As shown in FIG. 2, each of the blades 22 includes a conventional airfoil 26 having a radially inner root 26a and a radially outer tip 26b. A circumferential-entry dovetail 28 extends radially inwardly from the airfoil 26 and is fixedly joined thereto by being formed integrally with the airfoil root 26a. A blade platform 30 forms a radially inner flowpath surface for the air channeled between the airfoils 26 and is integrally formed with the blade 22 at the juncture between the airfoil root 26a and the dovetail 28.

Figure 3:
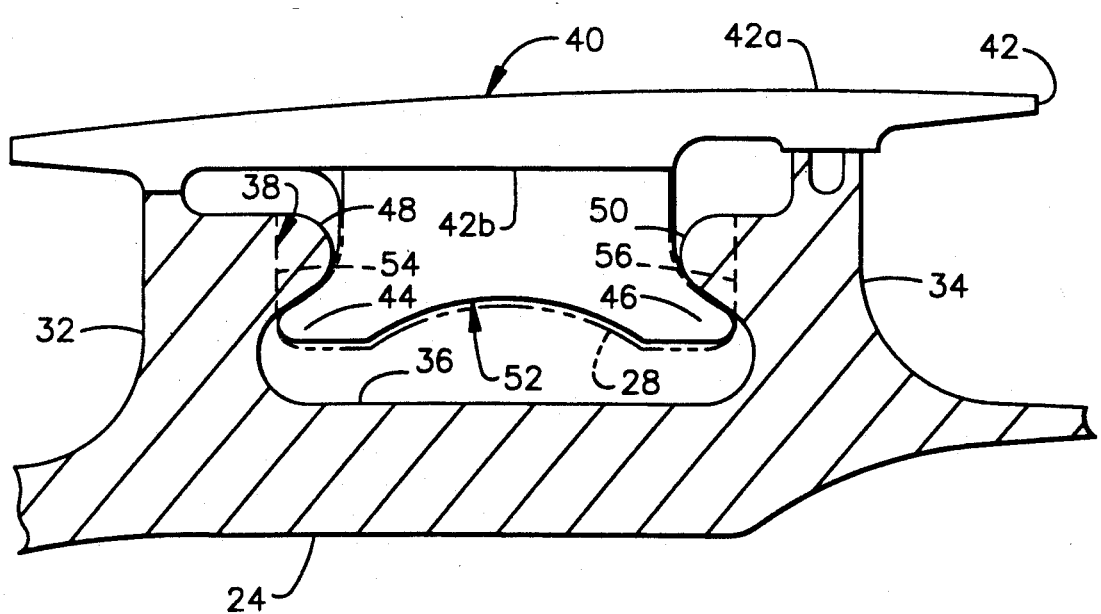
FIG. 3 is an axial, partly sectional view of a first embodiment of a platform spacer illustrated in FIG. 2 joined to the rotor disk and taken along line 3—3 therein.

As shown in FIGS. 2 and 3, the rotor disk 24 includes a first, or forward, circumferentially extending annular post 32 spaced axially apart from a second, or aft, circumferentially extending annular post 34 at the perimeter of the disk 24 which define therebetween a circumferentially extending dovetail groove 36. The dovetail groove 36 is complementary in configuration to the dovetail 28 for retaining the blade 22 to the rotor disk 24. As is conventionally known, in order to insert each of the dovetails 28 into the dovetail groove 36, the groove 36 has an axially enlarged portion defining a generally rectangular blade loading slot 38 as shown additionally in FIG. 4. The loading slot 38 extends radially inwardly through the rotor disk perimeter between the first and second posts 32, 34 for radially receiving each of the blade dovetails 28. As shown in phantom line in FIG. 4, one of the dovetails 28 is initially positioned radially inwardly into the loading slot 38 and is then positioned circumferentially to the right in the dovetail groove 36, with each blade 22 being in turn circumferentially positioned in the rotor disk 24 from the loading slot 38. The loading slot 38 has a generally rectangular configuration which is complementary to the outer transverse configuration of the blade dovetail 28 so that the dovetails 28 may be radially inserted into the retaining dovetail groove 36.

Referring again to FIG. 2, the rotor disk 24 of the exemplary rotor assembly 20 illustrated has a large diameter relative to the number of rotor blades 22 retained thereby. Accordingly, the blades 22 are circumferentially spaced apart from each such that exceptionally circumferentially wide blade platforms would conventionally be required therebetween to provide a substantially continuous inner flowpath boundary for the compressed airflow channeled between the adjacent airfoils 26. The resulting large platforms would have increased weight which is subject to centrifugal force during operation which, therefore, conventionally requires larger blade dovetails 28 and a correspondingly larger rotor risk 24 to support the increased loads during operation within acceptable stress limits.

In accordance with the present invention, the blade platforms 30 may be made as small as desirable in the circumferential direction, with the space between adjacent blade platforms 30 being filled instead by a plurality of discrete spacers 40, each spacer 40 being positioned between respective adjacent ones of the rotor blades 22 and independently joined to the rotor disk 24 so that the centrifugal loads generated thereby during operation are not carried through the blade dovetails 28 to the disk 24. Since each blade 22 includes an airfoil 26, its mounting dovetail 28 must be suitably sized for accommodating the centrifugal loads therefrom, which in turn determines the required size for the rotor disk 24 for retaining the blades thereto within acceptable stress limits. Since the spacers 40 are separately mounted to the disks 24 independently of the blades 22, and since they do not include airfoils extending therefrom, the centrifugal loads generated thereby are substantially less than those generated by the blades 22 and, therefore, the spacers 40 are secondary factors to the required sizing of the blade dovetails 28 and the dovetail groove portion of the disk 24.

Referring again to FIGS. 2-3, each of the spacers 40 includes a spacer platform 42 having a flat radially outer upper surface 42a being coextensive with the blade platforms 30 of adjacent blades 22, at a common radius therewith relative to the centerline axis 16, to provide a substantially continuous radially inner flowpath boundary between the airfoils 26 from blade platform 30-to-spacer platform 42-to-blade platform 30 around the circumference of the disk 24. The platform upper surface 42a is flat in the sense that it does not include an airfoil extending radially upward therefrom as provided for the blades 22, but is aerodynamically smooth to provide the flowpath boundary. As illustrated in FIG. 2, the spacer platform upper surface 42a is preferably arcuate and coextends with the blade platform 30 at a common radius from the centerline axis 16 to provide an annular radially inner flow boundary.

Figure 4:
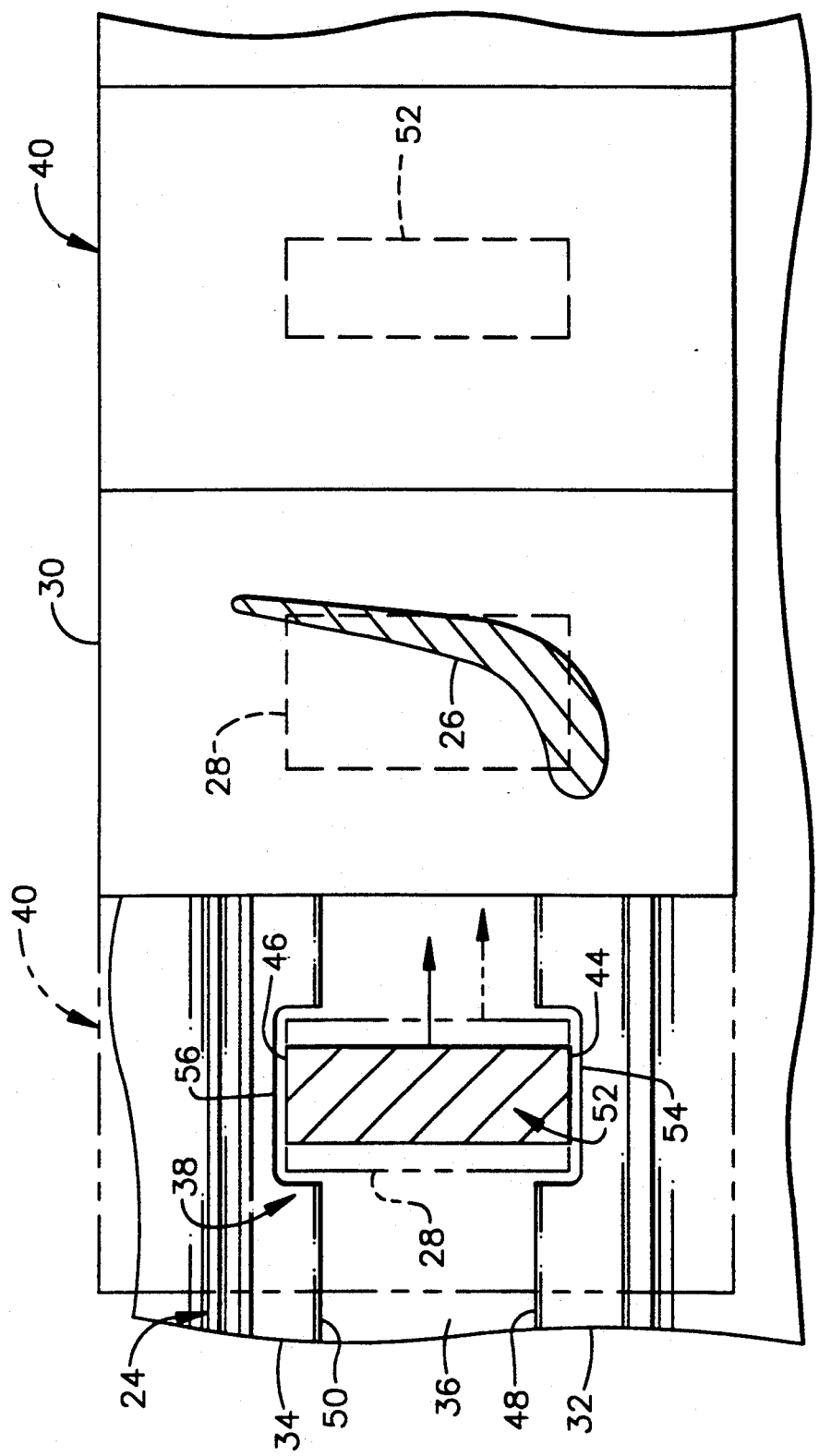
FIG. 4 is a top, partly sectional view of a portion of the blade row illustrated in FIG. 2 taken along line 4—4.

The spacer platform 42 also includes an opposite, radially inwardly facing lower surface 42b from which extend radially inwardly or downwardly therefrom first and second axially spaced apart hooks 44 and 46, respectively, which are provided for retaining the spacer 40 to the disk 24. More specifically, the disk 24 further includes first and second circumferentially extending, annular rails 48 and 50, respectively, which in the first embodiment illustrated in FIGS. 2-4 are integral with the first and second disk posts 32, 34, respectively, and face axially toward each other to define in part the dovetail groove 36. As shown more clearly in FIG. 3, the first and second rails 48, 50 are configured for retaining the blades 22 by their dovetails 28 (shown in phantom) to the disk 24, and define the conventional necked-in portion of the dovetail groove 36. In this exemplary first embodiment of the spacer 40, the first and second hooks 44, 46 collectively form a circumferential-entry spacer dovetail 52 configured substantially identically to the blade dovetail 28 for retention in the dovetail groove 36. The first and second rails 48, 50, therefore, are effective for retaining also the spacer dovetails 52 in the dovetail groove 36 of the disk 24.

In this first embodiment, the first and second rails 48, 50 as shown in FIGS. 3 and 4 include first and second generally U-shaped loading recesses 54 and 56, respectively, which axially face each other to define therebetween the blade loading slot 38 in the disk 24 at the dovetail groove 36 for allowing both the blades 22 and the spacers 40 to be loaded radially into the dovetail groove 36 for retention to the disk 24 by the rails 48, 50. As shown in FIG. 3, the spacer dovetail 52 is substantially identical in transverse configuration to the blade platform 28 for insertion radially inwardly through the first and second loading recesses 54, 56, respectively, to initially clear the first and second rails 48, 50, and then, as shown in FIG. 4, for positioning circumferentially along the first and second rails 48, 50 within the dovetail groove 36 for retention to the disk 24 by the first and second rails 48, 50.

By configuring the spacer dovetail 52 substantially identically to the blade dovetail 28, the same loading slot 38 may be used for inserting both the blades 22 and the spacers 40 into the common dovetail groove 36. In this way a relatively simple arrangement is provided for retaining the spacers 40 directly to the disk 24 without additional retention devices which would increase piece count and complexity of assembly during manufacture. However, all of the spacers 40 except the last one may be circumferentially positioned along the dovetail groove 36 for retention by the first and second posts 32, 34. Since the last spacer 40 would remain in the loading slot 38, it must be separately secured to the disk 24 to prevent its radial ejection therefrom. For example, the last spacer 40 may be retained in the loading slot 38 by providing conventional threaded fasteners or pins extending axially through the dovetail posts 32, 34 and into the respective first and second hooks 44, 46 (not shown).

Since the spacer dovetail 52 is required to support solely the centrifugal loads generated by the spacer 40 itself, it may be made substantially smaller, and therefore lighter, than the blade dovetails 28. As shown in FIG. 4, the spacer dovetail 52 is relatively thin in the circumferential direction compared to the circumferential width of the blade dovetail 28 and may be made as thin as feasibly for securing the spacer 40 to the disk 24.

Figure 5:
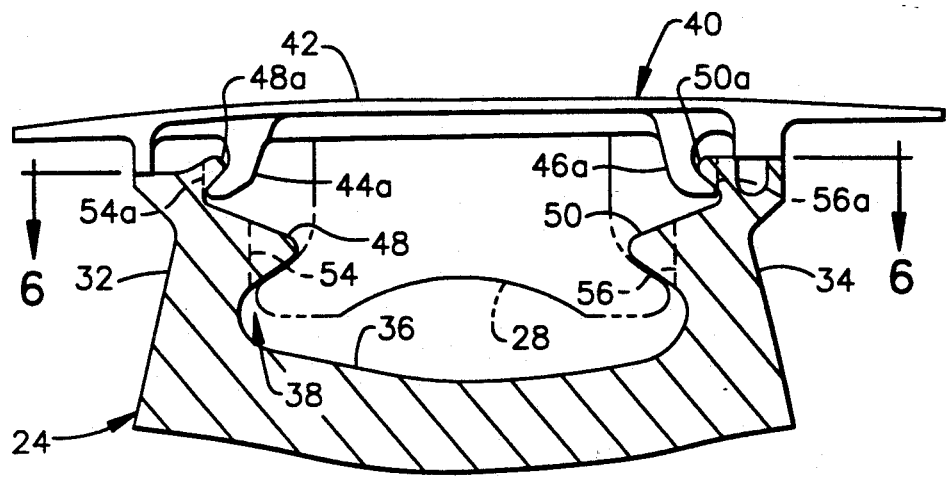
FIG. 5 is an axial, partly sectional view of a second embodiment of a platform spacer joined to the rotor disk.

However, the centrifugal load due to the weight of the individual spacers 40 is so low compared to that generated by the blades 22, that the additional weight inherent in the conventionally dovetail-shaped spacer dovetail 52 is not required for retaining the spacer 40 to the disk 24 within acceptable stress limits, and is therefore unnecessary. Accordingly, FIGS. 5 and 6 illustrate a second embodiment of the spacer 40 configured for further reducing the weight thereof while still being directly retained by the disk 24 in a relatively simple but structurally efficient fashion and for improving manufacture and assembly.

More specifically, the first and second hooks, designated in this embodiment 44a and 46a, respectively, are preferably discrete members axially spaced apart from each other for reducing material, and thereby weight, with the hooks 44a, 46a facing axially away from each other in this exemplary second embodiment. In order to yet further reduce the weight of the spacers 40, the first and second hooks 44a, 46a may be made radially shorter in height and suitably joined to the first and second posts 32, 34. In this second embodiment, the first and second spacer rails, designated 48a and 50a, respectively, are again integral with the first and second posts 32, 34, respectively, but are disposed radially above the dovetail groove 36, above the loading slot 38, and above the first and second blade rails 48, 50 thereof. As shown in FIG. 5, the first and second rails 48a, 50a in this embodiment are formed integrally at the radially outer tops of the posts 32, 34 and are axially spaced apart from each other for allowing the blade dovetail 28 to be radially inserted therebetween without obstruction therefrom and through the loading slot 38 into the dovetail groove 36. In this way, the blade dovetails 28 may be conventionally inserted through the first and second rails 48 and 50 at the loading slot 38 prior to being circumferentially moved along both the first and second rails 48, 50 into position along the circumference of the disk 24. The spacer first rail 48a in this second embodiment faces axially toward the spacer second rail 50a, with the spacer first loading recess 54a similarly facing toward the spacer second loading recess 56a and being circumferentially aligned therewith for radially receiving the platform first and second hooks 44a, 46a.

Figure 6:
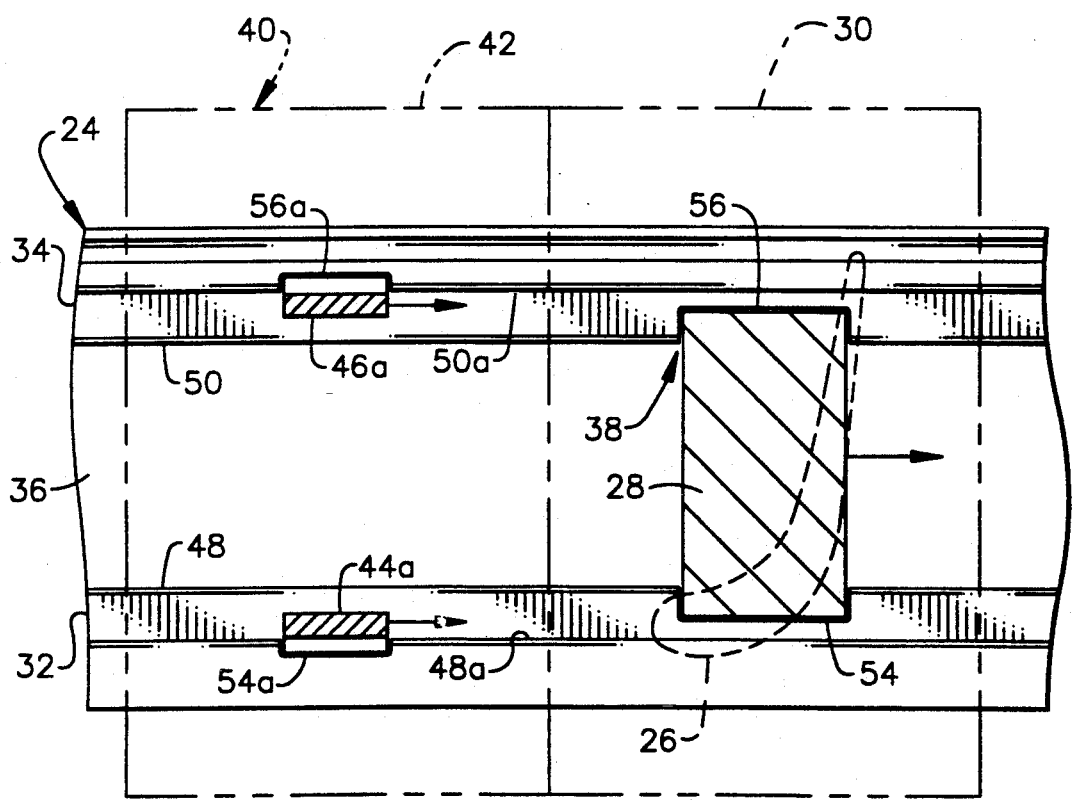
FIG. 6 is a top, partly sectional view of the rotor disk illustrated in FIG. 5 taken along line 6—6.

As shown in FIG. 6, each of the spacers 40 may be initially inserted during assembly radially inwardly into the loading recesses 54a, 56a so that the hooks 44a, 46a may pass through and clear the rails 48a, 50a. And then, the spacer 40 is moved circumferentially along the rails 48a, 50a into position adjacent to one of the blades 22. In this way, a blade 22 may be loaded into the disk 24 through the loading slot 38 and moved circumferentially into position along the dovetail groove 36, with an adjacent spacer 40 being loaded through the loading recesses 54a, 56a and moved circumferentially into position adjacent to the so inserted blade 22. This sequence is repeated with a blade 22 being inserted into the disk 24 followed in turn by a spacer 40 until the disk 24 includes its full complement of blades 22 and spacers 40 between adjacent ones thereof. Of course, the blades 22 and the spacers 40 may be inserted through their respective loading slots 38 and loading recesses 54a, 56a in any order desired.

In the preferred embodiment, the first and second loading recesses 54a, 56a as shown in FIG. 6 are preferably spaced circumferentially from the blade loading slot 38 so that the last one of either the blades 22 or the spacers 40 may be inserted into the disk 24 without obstruction from adjacent spacers 40 or blades 22, respectively. And then, all of the blades 22 and spacers 40 joined to the disk 24 may be circumferentially moved together therein so that no dovetail 28 is aligned with the loading slot 38 and no hooks 44a, 46a are aligned with the respective loading recesses 54a, 56a. In this way, the blade dovetails 28 and the spacer hooks 44a, 46a are positioned for radial retention to the disk 24 by their respective rails 48, 50 and 48a, 50a.

Figure 7:
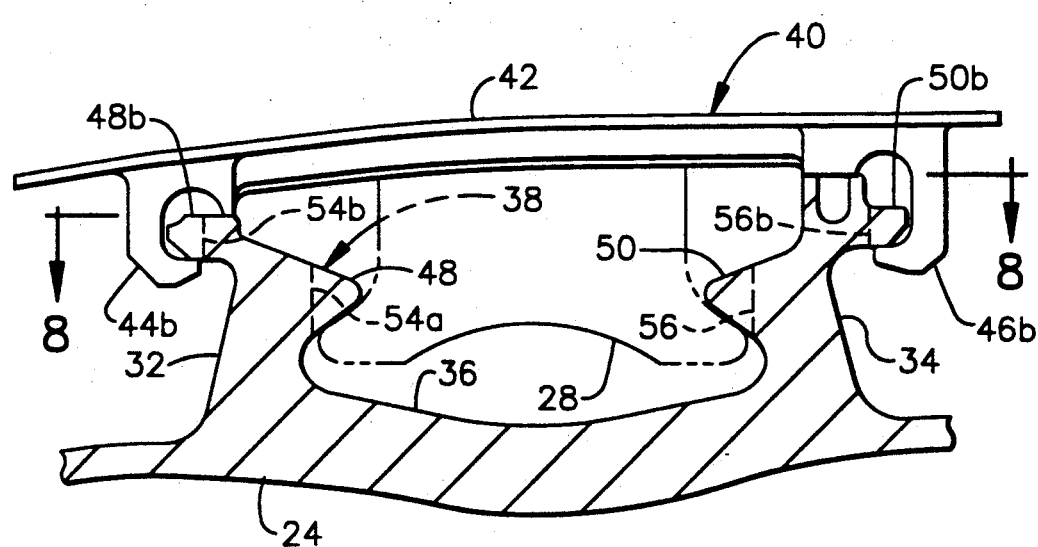
FIG. 7 is an axial, partly sectional view of a third embodiment of a platform spacer joined to the rotor disk.
Figure 8:
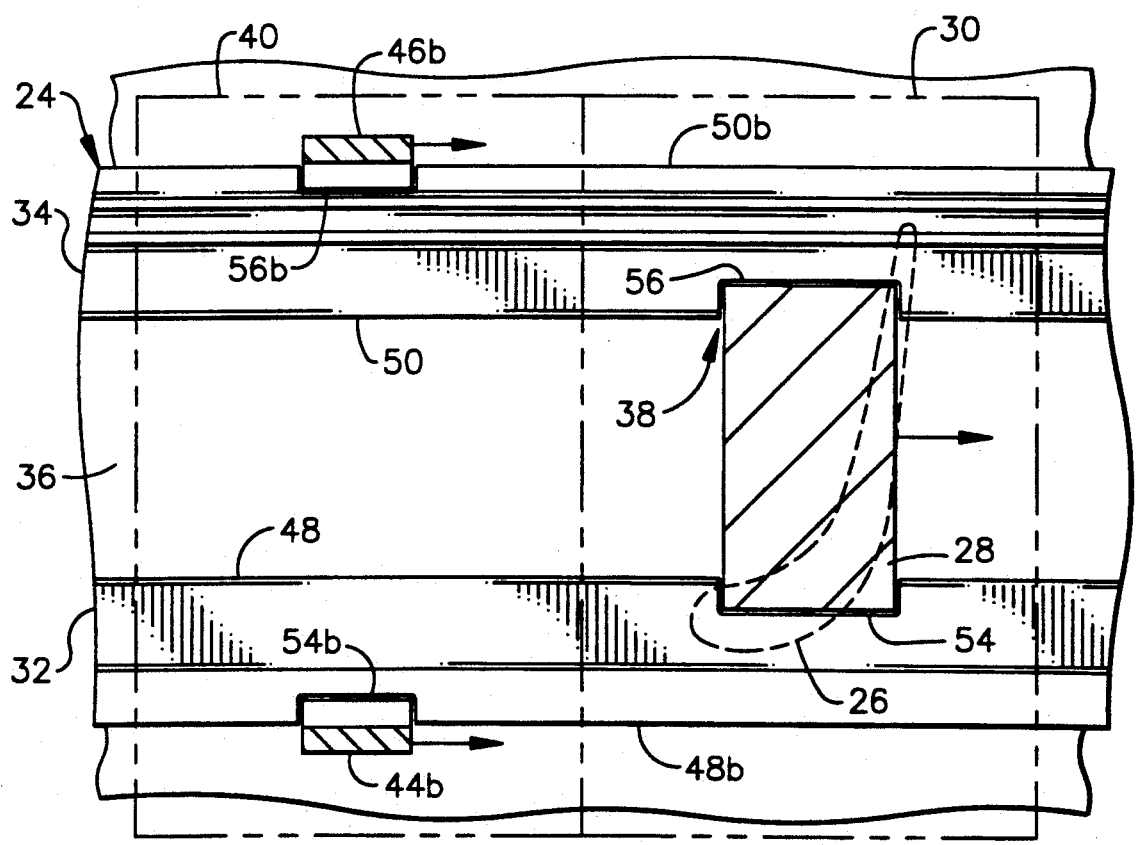
FIG. 8 is a top, partly sectional view of the rotor disk illustrated in FIG. 7 taken along line 8—8.

Illustrated in FIGS. 7 and 8 is a third embodiment of the spacers 40 where the first and second hooks, designated 44b and 46b, respectively, are again discrete members axially spaced apart from each other, but face axially toward each other. Correspondingly, the first and second spacer rails, designated 48b and 50b, respectively, are integral with the first and second posts 32, 34, respectively, and are disposed radially above the dovetail groove 36, above the loading slot 38, and above the first and second blade rails 48, 50, and are axially spaced apart from each other for allowing the blade dovetail 28 to be radially inserted therebetween without obstruction therefrom. In this third embodiment, the spacer first rail 48b faces axially away from the spacer second rail 50b, and the first loading recess, designated 54b, faces axially away from the second loading recess, designated 56b, and is circumferentially aligned therewith for radially receiving the platform first and second hooks 44b, 46b, respectively.

Just as in the second embodiment disclosed above, the first and second loading recesses 54b, 56b are preferably circumferentially spaced from the blade loading slot 38 so that the blades 22 and the spacers 40 may be separately inserted into the disk 24 and circumferentially moved into position therein. The assembly procedure for the blades 22 and the spacers 40 is identical to that described above with respect to the second embodiment but provides a different configuration of the hooks 44b, 46b which are axially spaced apart from each other more than the spacing between the hooks 44a, 46a of the second embodiment. This third embodiment similarly allows the blades 22 and spacers 40, which completely fill the disk 24, to be circumferentially moved into position so that no blade dovetail 28 is positioned in line with the loading slot 28, and no hooks 44b, 46b are positioned in line with their respective loading recesses 54b, 56b. And, substantial weight savings and structural efficiency are again obtained from this third embodiment just as in the second embodiment.

Figure 9:
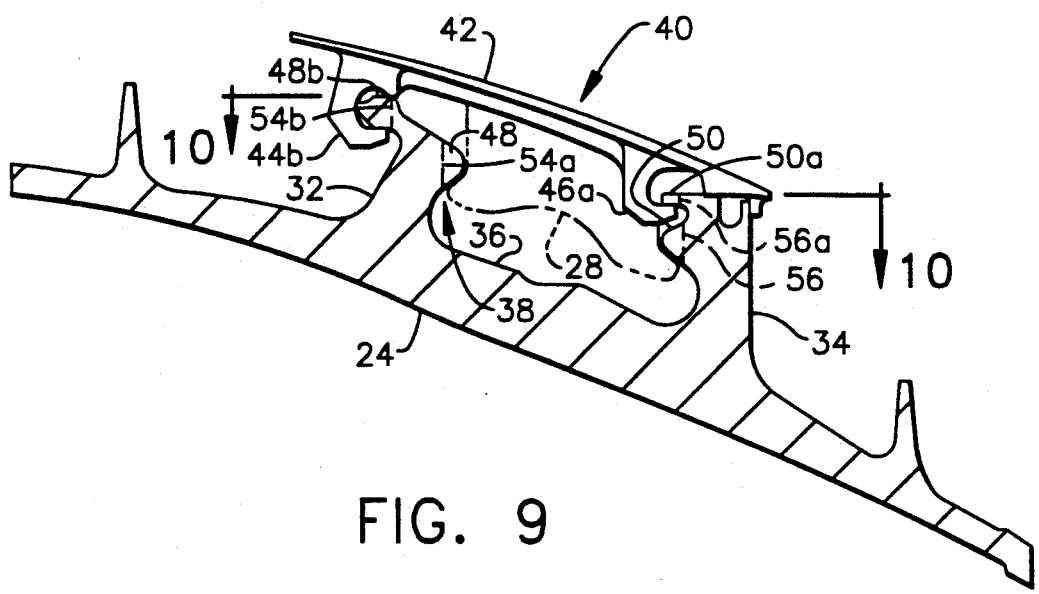
FIG. 9 is an axial, partly sectional view of a fourth embodiment of a platform spacer joined to the rotor disk.
Figure 10:
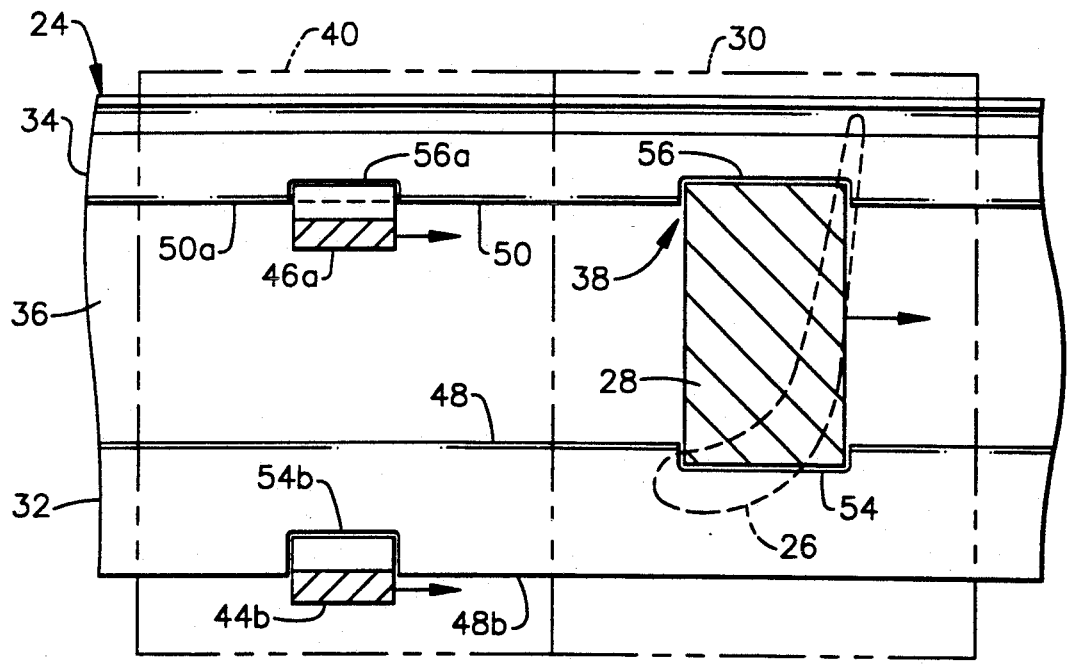
FIG. 10 is a top, partly sectional view of the rotor disk illustrated in FIG. 9 taken along line 10—10.

Illustrated in FIGS. 9 and 10 is a fourth embodiment of the spacers 40 wherein the first and second hooks, designated 44b and 46a, respectively, are again discrete members axially spaced apart from each other, but instead of facing away from each other as in the second embodiment illustrated in FIGS. 5 and 6, or facing toward each other as in the third embodiment illustrated in FIGS. 7 and 8, instead both face in the same axial direction, for example both face in the aft direction, although they could both face in the forward direction. Accordingly the first hook in the fourth embodiment illustrated in FIGS. 9 and 10 is designated 44b since it is substantially identical to the first hook 44b disclosed in the third embodiment illustrated in FIGS. 7 and 8. And, similarly, the second hook is designated 46a since it is substantially identical to the second hook 46a of the second embodiment illustrated in FIGS. 5 and 6.

Correspondingly, the first and second spacer rails, designated 48b and 50a, respectively, are integral with the first and second posts 32, 34, respectively, and disposed radially above the dovetail groove 36, the loading slot 38, and the blade rails 48, 50, and are axially spaced apart from each other for allowing the blade dovetail 28 to be radially inserted therebetween without obstruction. The first and second rails 48b, 50a face in the same, upstream, axial direction opposite to that of the first and second hooks 44b, 46a, and the first and second loading recesses 54b, 56a face in the same axial direction as the first and second rails 48b, 50a, and are circumferentially aligned with each other for radially receiving the platform first and second hooks 44b, 46a.

Similar to the second and third embodiments described above, the first and second loading recesses 54b, 56a are preferably spaced circumferentially from the blade loading slot 38 for allowing the blades 22 and the spacers 40 to be inserted into the disk 24 in an identical manner to that described above for the second and third embodiments.

In all four embodiments described above, the separate spacers 40 allow weight to be removed from the blades 22 which, therefore, reduces centrifugal loads acting on the blades 22 during operation which allows the blade dovetails 28 and rotor disks 24 to be suitably reduced in size which provides an improvement in SFC. Accordingly, the weight savings from this invention is threefold. Firstly, by removing the circumferentially extending portions of the blade platform 30 which would otherwise abut each other, the weight of the blade 22 is reduced. Lower blade weight results in lower centrifugal load therefrom during operation. Secondly, lower centrifugal load allows the blade dovetails 28 to be reduced in size for further reducing the weight of the blade 22 and associated centrifugal load therefrom. And, thirdly, the smaller centrifugal load applied by the blades 22 to the disk 24 allows the weight of the disk 24 itself to be reduced. This results in a substantial weight savings for the entire rotor assembly 20 which improves SFC.

The centrifugal load generated by the spacers 40 themselves will be relatively small due to their lightweight construction without integral airfoils. In all of the embodiments disclosed above, the circumferential spacing between adjacent blades 22 is relatively large which necessarily allows the spacers 40 to transfer their centrifugal load to the rotor disk 24 through their hooks 44, 46 centrally between adjacent blades 22. The spacers 40, therefore, affect the size of the disk 24 only secondarily, which is a relatively small effect compared to the centrifugal loads generated by the blades 22.

By providing the spacer platforms 42 as discrete members not physically attached to the blades 22, they may be separately manufactured, and they may also be made of a different material than that required for the rotor blades 22 for carrying the centrifugal loads therein. Since the centrifugal loads effected by the spacers 40 are relatively small in comparison, the different materials may be selected as desired for further decreasing weight. For example, the spacers 40 may be formed from lightweight aluminum or conventional composite materials for further reducing weight of the rotor assembly 20. Since the centrifugal loads from the spacers 40 are relatively small, the load carrying capability of the material forming the spacers 40 may be reduced for reducing the overall weight of the rotor assembly 20 while still resulting in acceptable levels of stress therein.

In all of the embodiments disclosed above, the various hooks 44, 46 directly join the spacers 40 to the rotor disk 24 without additional retention devices which reduces piece-count and assembly time.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A rotor assembly comprising:
   a rotor disk including annular first and second posts defining therebetween a circumferentially extending dovetail groove having an enlarged portion defining a loading slot; and first and second annular rails having first and second loading recesses, respectively;
   a plurality of circumferentially spaced apart rotor blades retained in said dovetail groove, each blade having an airfoil, a platform, and a dovetail, said blade dovetail being configured for insertion radially inwardly into said loading slot and then for positioning circumferentially along said dovetail groove for being retained to said disk; and
   a plurality of spacers joined to said first and second rails, each spacer being positioned between respective adjacent ones of said blades and including a platform having an upper surface without an integral airfoil and being coextensive with said blade platforms of said adjacent blades, and an opposite lower surface, each spacer also including first and second hooks configured for insertion radially inwardly through said first and second loading recesses, respectively, to clear said first and second rails, and then for positioning circumferentially along said first and second rails for retention to said disk by said first and second rails.

2. A rotor assembly according to claim 1 wherein:
   said first and second rails are integral with said first and second disk posts and face toward each other to define in part said dovetail groove, and are configured for retaining also said blades to said disk;
   said first and second hooks collectively form a circumferential-entry spacer dovetail configured for retention in said dovetail groove; and
   said first and second loading recesses face each other to define therebetween said blade loading slot for allowing both said blades and spacers to be loaded into said dovetail groove for retention to said disk.

3. A rotor assembly according to claim 1 wherein:
   said first and second hooks are spaced apart and face away from each other;
   said first and second rails are integral with said first and second posts, respectively, radially above said dovetail groove and said loading slot, and are spaced apart from each other for allowing said blade dovetail to be radially inserted therebetween without obstruction, with said first rail facing toward said second rail, and said first loading recess facing toward said second loading recess and aligned therewith for radially receiving said platform first and second hooks; and
   said first and second loading recesses being spaced circumferentially from said blade loading slot.

4. A rotor assembly according to claim 1 wherein:

said first and second hooks are spaced apart and face toward each other;

said first and second rails are integral with said first and second posts, respectively, radially above said dovetail groove and said loading slot, and are spaced from each other for allowing said blade dovetail to be radially inserted therebetween without obstruction, with said first rail facing away from said second rail, and said first loading recess facing away from said second loading recess and aligned therewith for radially receiving said platform first and second hooks; and said first and second loading recesses being spaced circumferentially from said blade loading slot.

5. A rotor assembly according to claim 1 wherein:

said first and second hooks are spaced apart and face in the same direction;

said first and second rails are integral with said first and second posts, respectively, radially above said dovetail groove and said loading slot, and are spaced apart from each other for allowing said blade dovetail to be radially inserted therebetween without obstruction, with said first and second rails facing in the same direction, opposite to said first and second hooks, said first and second loading recesses facing in the same direction as said first and second rails and aligned with each other for radially receiving said platform first and second hooks; and said first and second loading recesses being spaced circumferentially from said blade loading slot.

6. A spacer for a rotor disk having a circumferential dovetail groove retaining a plurality of circumferentially spaced apart rotor blades having integral platforms, said rotor disk also including first and second annular rails having first and second loading recesses, respectively, said spacer being positionable between adjacent ones of said blades and comprising:

a spacer platform having an upper surface without an integral airfoil and sized for abutting adjacent ones of said blade platforms and forming an inner flowpath boundary for fluid flow between said blades, and having an opposite lower surface; and first and second spaced apart hooks extending downwardly from said spacer platform lower surface, said first and second hooks being configured for insertion radially inwardly through said first and second loading recesses to clear said first and second rails and then for being circumferentially moved along both said first and second rails into position for being retained to said rotor disk by said first and second rails.

7. A spacer according to claim 6 wherein said first and second hooks, collectively form a circumferential-entry spacer dovetail configured for retention in said dovetail groove, and said first and second loading recesses define a loading slot in said disk at said dovetail groove for allowing both said blades and spacers to be loaded into said dovetail groove for retention to said disk.

8. A spacer according to claim 6 wherein said first and second hooks are spaced apart and face away from each other.

9. A spacer according to claim 6 wherein said first and second hooks are spaced apart and face toward each other.

10. A spacer according to claim 6 wherein said first and second hooks are spaced apart and face in the same direction.

* * * * *